United States Patent
Hehn et al.

(10) Patent No.: US 12,522,343 B2
(45) Date of Patent: Jan. 13, 2026

(54) METHODS OF TAKING A MEASUREMENT

(71) Applicant: Verity AG, Zürich (CH)

(72) Inventors: Markus Hehn, Zürich (CH); Luciano D. Beffa, Zürich (CH)

(73) Assignee: Verity AG, Zürich (CH)

( * ) Notice: Subject to any disclaimer, the term of this patent is extended or adjusted under 35 U.S.C. 154(b) by 0 days.

(21) Appl. No.: 18/589,332

(22) Filed: Feb. 27, 2024

(65) Prior Publication Data

US 2024/0199207 A1   Jun. 20, 2024

Related U.S. Application Data

(63) Continuation of application No. 17/945,749, filed on Sep. 15, 2022, now Pat. No. 11,932,397, which is a continuation of application No. 16/485,362, filed as application No. PCT/IB2018/050966 on Feb. 16, 2018, now Pat. No. 11,485,492.

(60) Provisional application No. 62/460,699, filed on Feb. 17, 2017.

(51) Int. Cl.
   *G05D 1/00*   (2024.01)
   *B64C 11/00*  (2006.01)
   (Continued)

(52) U.S. Cl.
   CPC .............. *B64C 11/00* (2013.01); *B64C 19/02* (2013.01); *B64C 27/04* (2013.01); *B64U 30/20* (2023.01);
   (Continued)

(58) Field of Classification Search
   CPC .............. B64D 47/08; B64C 2201/123; B64C 2201/127
   See application file for complete search history.

(56) References Cited

U.S. PATENT DOCUMENTS 8,954,206 B2 *   2/2015   Criado .................... B64C 31/02
                                                      701/4
9,513,635 B1 *  12/2016   Bethke ................. G05D 1/0094
(Continued)

FOREIGN PATENT DOCUMENTS

CA        2960749 A1    4/2016
CN      105159321 A    12/2015
(Continued)

OTHER PUBLICATIONS

International Search Report and Written Opinion for PCT/IB2018/050966, dated Apr. 19, 2018, 9 pages.
(Continued)

*Primary Examiner* — Timothy D Collins
*Assistant Examiner* — Justin Michael Heston
(74) *Attorney, Agent, or Firm* — Blank Rome LLP (57) ABSTRACT

According to the present invention there is provided a method of taking a measurement using a sensor mounted on an aerial vehicle, the aerial vehicle having one or more propellers and one or more motors which are selectively operable to drive the one or more propellers to rotate to cause the vehicle to fly, and a sensor mounted on the aerial vehicle, the method comprising the steps of, operating the one or more motors to drive the one or more propellers to cause the vehicle to fly; at a first time instant, slowing down or turning off said one or more motors; while the one or more motors are slowed down or turned off, taking a measurement using said sensor; at a second time instant, which is after the measurement has been taken using the sensor, operating the one or more motors again to drive the one or more propellers to cause the vehicle to fly. There is further provided a corresponding aerial vehicle.

20 Claims, 6 Drawing Sheets

(51) Int. Cl.
    *B64C 19/02*     (2006.01)
    *B64C 27/04*     (2006.01)
    *B64U 30/20*     (2023.01)
    *B64U 101/30*     (2023.01)
    *G05D 1/689*     (2024.01)
    *H04N 7/18*     (2006.01)
    *B64U 10/13*     (2023.01)

(52) U.S. Cl.
    CPC ........... *G05D 1/0094* (2013.01); *G05D 1/042* (2013.01); *G05D 1/689* (2024.01); *H04N 7/188* (2013.01); *B64U 10/13* (2023.01); *B64U 2101/30* (2023.01)

(56) References Cited

U.S. PATENT DOCUMENTS

| | | | | |
|---|---|---|---|---|
| 10,599,926 | B2* | 3/2020 | Papanikolopoulos | ........................ G06V 20/188 |
| 11,485,492 | B2* | 11/2022 | Hehn | ........................ B64C 19/02 |
| 11,932,397 | B2* | 3/2024 | Hehn | ........................ G05D 1/689 |
| 2017/0006263 | A1* | 1/2017 | Sron | ........................ H04N 7/183 |
| 2017/0283088 | A1 | 10/2017 | Sabe | |
| 2017/0300066 | A1* | 10/2017 | Douglas | ............... G05D 1/0858 |
| 2018/0002013 | A1* | 1/2018 | McCullough | .......... B64U 50/19 |

FOREIGN PATENT DOCUMENTS

| | | | |
|---|---|---|---|
| WO | WO-2015/085598 | A1 | 6/2015 |
| WO | WO-2016/059877 | A1 | 4/2016 |

OTHER PUBLICATIONS

Holm, "Drone Free Fall", Jan. 16, 2017, YouTube [https://www.youtube.com/watch?v=k3FPqt6OtuM] (Year: 2017).

AliShanMao, "Eachine Wizard 220 FPV Hang Time and Freefall", Dec. 4, 2016, YouTube [https://www.youtube.com/watch?v=7gJgfFeZ6Rg] (Year: 2016).

AliShanMao, "Those moments of Silence Eachine Wizard 220 FPV Freefall", Dec. 18, 2016, YouTube [https://www.youtube.com/watch?v=VY3S3Ei4DVI] (Year: 2016).

* cited by examiner

METHODS OF TAKING A MEASUREMENT

RELATED APPLICATIONS

This application is a continuation application of U.S. patent application Ser. No. 17/945,749, filed on Sep. 15, 2022, which is a continuation application of U.S. patent application Ser. No. 16/485,362, filed on Aug. 12, 2019, now U.S. Pat. No. 11,485,492, issued on Nov. 1, 2022, which is a national phase of PCT/IB2018/050966, filed on Feb. 16, 2018, which claims the benefit of U.S. Provisional Application No. 62/460,699, filed on Feb. 17, 2017. The entire contents of these applications are hereby incorporated by reference.

FIELD OF THE INVENTION

The present invention concerns a method of taking a measurement using a sensor mounted on an aerial vehicle which comprises one or more propellers; wherein one or more motors which drive the one or more propellers are slowed down or turned off, and a measurement is taken using said sensor while the one or more motors are slowed down or turned off.

BACKGROUND TO THE INVENTION

Aerial vehicles are widely used as flying sensor platforms to capture measurements. The vehicle is flown to a desired position. Once at the desired position, a sensor mounted on the aerial vehicle is operated to capture a measurement. Typically, the aerial vehicles comprise propellers, which are driven by motors; when driven by the one or more motors the propellers rotate to generate a thrust force which enables the aerial vehicle to fly.

Disadvantageously, the propellers and/or motors tend to cause aerial vehicles to vibrate when they are in use. These vibrations are caused by imperfect balance of the rotating masses of propellers and/or motors causing forces and torques to act on the aerial vehicle, as well as due to aerodynamic interactions between the airflow generated by the propeller and other components of the aerial vehicles (e.g. pressure waves or tip vortices hitting the structure of the aerial vehicle). Therefore, if the sensor is operated during flight to capture a measurement, the vibrations can negatively affect the captured measurement. Many sensors take measurements in a specific direction (e.g. Pitot tube wind speed sensors, imaging sensors, and star trackers). Disadvantageously, the orientation of the body of many aerial vehicles is dictated by the need to orient lift-generating surfaces such that the effect of gravity on the aerial vehicle is opposed. To freely orient the sensor, many aerial vehicles use gimbals onto which the sensor is mounted to allow the pointing of the sensor in a direction of interest. Such gimbals add cost and complexity to aerial vehicles.

For example, some aerial vehicles are equipped with imaging sensors, the measurements of which are images. When operated during flight, the vibrations result in motion blur in the captured images due to the camera vibrating during the exposure time; said motion blur is especially evident in low-light conditions where a camera requires a longer exposure time to achieve an image with an acceptable signal-to-noise ratio which in turn requires the camera to remain stationary (or substantially stationary) for an equally longer amount of time; in addition, a "Jello effect" can occur due to the rolling shutter interacting with vibrations of the camera; an event-based imaging sensor/dynamic vision sensor may record a large number of pixel events due the relative motion of the sensor with respect to the environment caused by the vibrations. Preferably, the imaging sensor is an active pixel sensor because such sensors combine small size, low power consumption, and high capture frequencies. In a more preferred embodiment, the imaging sensor is a complementary metal-oxide-semiconductor (CMOS) active pixel sensor due to its low cost, small size, and low power consumption. CMOS imaging sensors are particularly susceptible to rolling shutter ("Jello") effects, which are greatly amplified by vibrations and therefore largely mitigated by this invention.

In other examples of the prior art aerial vehicles having a 3D scanning sensor (3D scanner) mounted thereon are widely used to record depth data that can be used to create three-dimensional models. The propellers and/or motors, when in use, can disturb and/or compromise the measurements taken by the 3D scanner; in particular, the vibration of the aerial vehicle caused by propellers and/or motors when the propellers and/or motors are in use can compromise the data by introducing motion blur, or by causing momentary changes in the orientation of the 3D scanning sensor.

In another example the aerial vehicles are provided with one or more ultrasonic sensors and/or one or more laser-based sensors which may for example be used to measure distance such as the distance from the aerial vehicle to the ground. The vibrations which the vehicle undergoes, and/or the magnetic fields generated by electric motors in the vehicle, will result in noise in the measurements taken by the one or more ultrasonic sensors and/or the one or more laser-based sensors (e.g. the vibrations which the vehicle undergoes will result in a constantly changing distance from the aerial vehicle to the ground such that the one or more ultrasonic sensors and/or the one or more laser-based sensors will be unable to take a stable and/or accurate distance measurement).

In another example the aerial vehicles are provided with one or more microphones which are used to take sound measurements. In such an example the one or more motors which drive the propellers and/or the propellers themselves and/or the airflow caused by said propellers will cause sounds which will be "noise" for the sound measurements taken by the one or more microphones. In addition, the air flow caused by the aerial vehicle moving with respect to the surrounding air will cause sounds which will be "noise" for the sound measurements taken by the one or more microphones.

In yet a further example the aerial vehicles are provided with one or more magnetic field sensors which are used to measure magnetic fields. In such an example the current which flows to electric motors operable to drive the propellers to spin when the motors and propellers are in use, will generate a changing magnetic field which will be "noise" for the magnetic measurements taken by the one or more magnetic field sensors.

It is an aim of the present invention to mitigate or obviate at least some of the disadvantages associated with the methods of the prior art.

BRIEF SUMMARY OF THE INVENTION

According to the invention, these aims are achieved by means of a method and/or aerial vehicle having the features recited in the independent claims; wherein the dependent claims recite optional features of preferred embodiments.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1A:
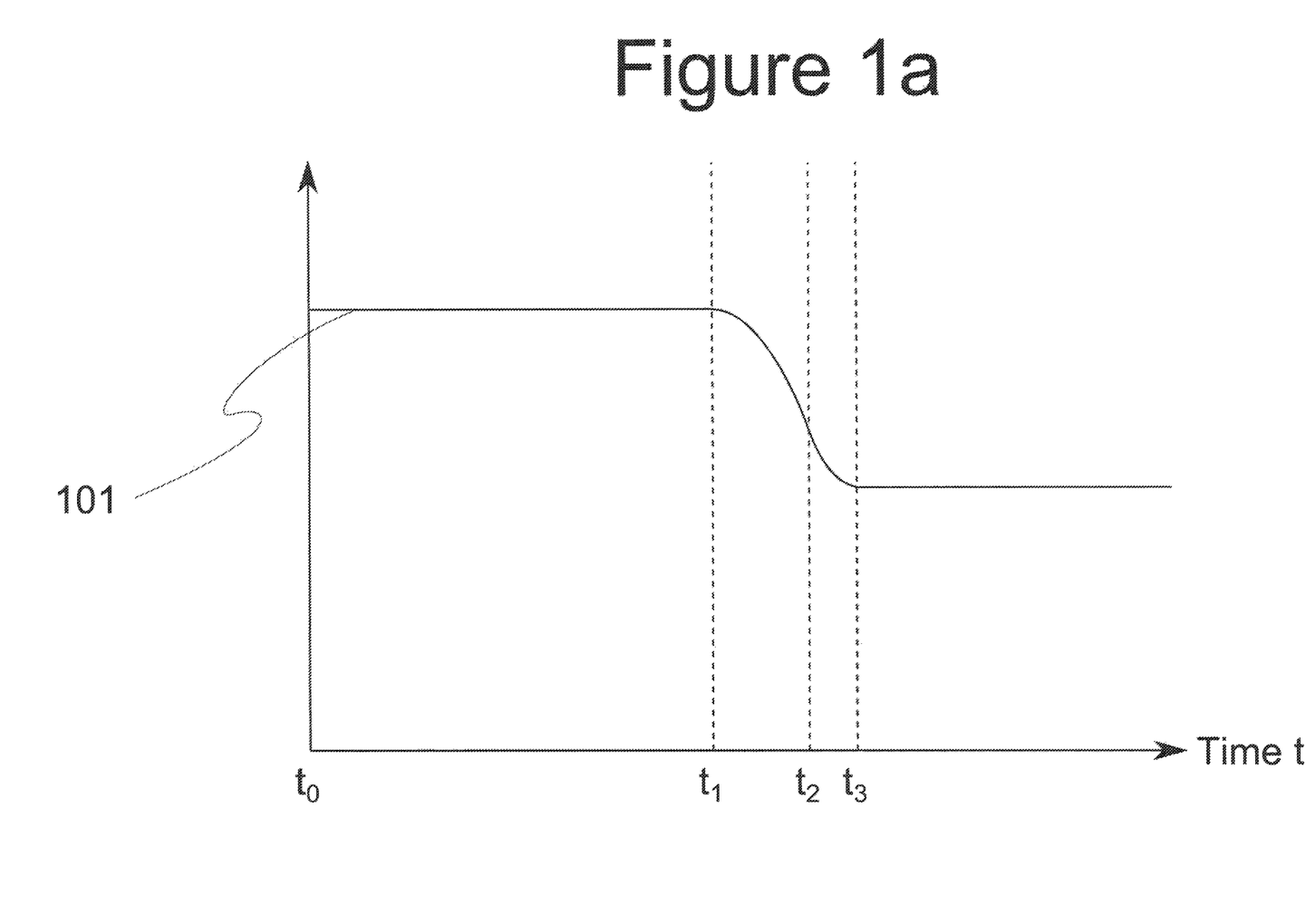
FIG. 1a illustrates the flight path of an aerial vehicle which performs a method of taking a measurement using a sensor/measurement means mounted on an aerial vehicle, according to an embodiment of the present invention.

FIG. 1a illustrates the altitude 101 of an aerial vehicle which performs a method of taking a measurement using a sensor/measurement means mounted on an aerial vehicle, according to an embodiment of the present invention. The aerial vehicle comprises one or more propellers and one or more motors which are selectively operable to drive the one or more propellers; when the one or more propellers rotate they generate a thrust force which causes the vehicle to fly. A sensor/measurement means is mounted on the aerial vehicle; the sensor/measurement means is operable to take measurements. The sensor/measurement means may be of any suitable type and may take any suitable form; for example, the sensor/measurement means may be a magnetometer configured to take a single measurement or multiple measurements; in another example the sensor/measurement means may be a microphone configured to take a short sequence of measurements; in another example the sensor/measurement means may be a thermal imaging sensor/measurement means configured to capture a single image.

Referring to FIG. 1a, between time t0 and a first time instant t1 the one or more motors are operating to drive the one or more propellers to rotate; the rotation of the propellers will generate a thrust which will cause the vehicle to fly (in this example to fly at a substantially constant altitude); however it will be understood that it is not essential for the vehicle to fly at a substantially constant altitude between time to and the first time instant t1. It should be understood that in the present application the term 'motor' includes electric motors as well as internal combustion engines, which typically cause even stronger vibrations due to the translational motion of the piston(s).

At a first time instant t1 a controller provided in the aerial vehicle receives a first command which indicates that the sensor/measurement means should take a measurement. This command may be provided by a user to the controller via a keyboard/control panel/or PC which is in wireless, or wired communication with the controller. In the present application the term 'controller' describes a processing unit designed to compute one or more speed commands that, if provided to the one or more motors, configures the one or more motors to rotate at or close to one or more rotation speeds equal to one or more speed specified in said speed commands. In addition, said controller is connected to the sensor/measurement means; and said controller is configured such that the controller can initiate the sensor/measurement means to take a measurement.

In response to receiving the first command the controller turns off said one or more motors. When the one or more motors are turned off said motors no longer drive the one or more propellers to rotate and the rotation of the one or more propellers will begin to slow; if the one or more motors are turned off for long enough the propellers may eventually slow to a standstill. In most cases the one or more propellers will continue spinning due to aerodynamic torques (windmill effect).

After the one or more motors have been turned off the controller then initiates the sensor/measurement means which is mounted on the aerial vehicle to take a measurement.

At a second time instant t2, which occurs after the sensor/measurement means has taken a measurement, the controller operates the one or more motors again to drive the one or more propellers to rotate; the rotation of the one or more propellers will generate a thrust. The controller will define a target speed of rotation for the one or more propellers; in order to counter the downward momentum of the vehicle, at the second time instant t2 the controller defines said target speed of rotation for the one or more propellers in excess of the speed of rotation of the one or more propellers required to maintain a substantially constant altitude; the increased speed of the propellers will provide additional lift force necessary to counter the downward momentum of the vehicle; however, since the lift force results in an acceleration acting on the vehicle, the downward momentum of the vehicle may not be instantaneously changed, thus the vehicle will continue to decrease in altitude between the second time instant t2 and a third time instant t3. However since during the time between the second time instant t2 and a third time instant t3 the downward momentum is gradually approaching zero momentum, the rate at which the vehicle drops in altitude slows between the second time instant t2 and a third time instant t3.

At a third time instant t3, the controller operates the one or more motors to rotate the one or more propellers at a rotational speed required to maintain a substantially constant altitude thus generating sufficient lift to maintain the vehicle at a substantially constant altitude.

Advantageously, in the embodiment illustrated in FIG. 1a, since the motors are turned off when the sensor/measurement means is taking a measurement the measurement taken by the sensor/measurement means will have a higher signal-to-noise ratio; specifically, the noise caused by vibration of the one or more motors or the one or more propellers, and any other potential measurement noise caused by operating the one or more motors (such as changing magnetic fields, combustion sounds, or heat) will at least be reduced or is substantially zero.

Figure 1B:
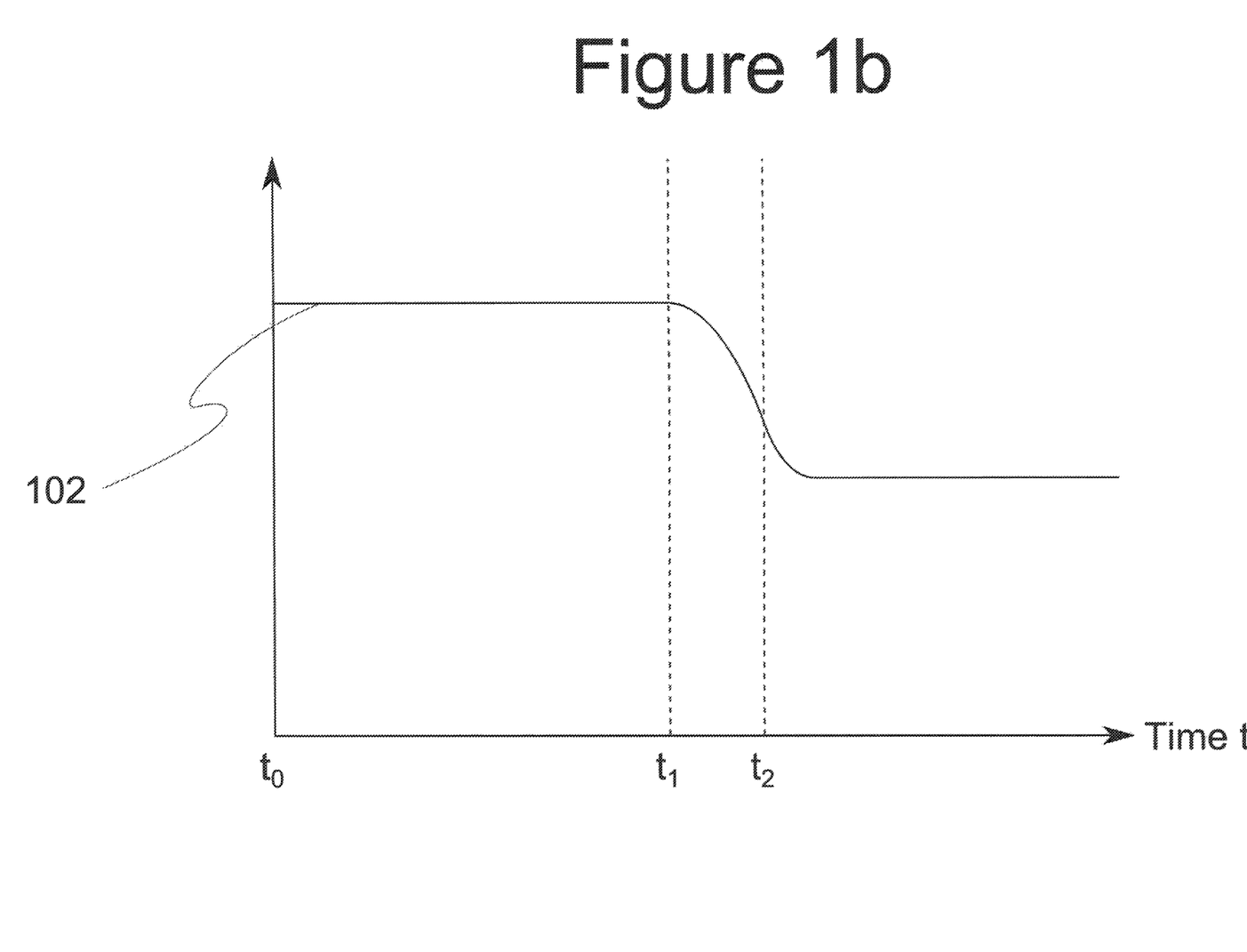
FIG. 1b illustrates the flight path of an aerial vehicle which performs a method capturing an image using a camera mounted on an aerial vehicle, according to an embodiment of the present invention.

FIG. 1b illustrates the flight altitude 102 of an aerial vehicle which performs a method of capturing an image using an image sensor (e.g. camera) mounted on an aerial vehicle, according to an embodiment of the present invention. The aerial vehicle comprises one or more propellers and one or more motors which are selectively operable to drive the one or more propellers; when the one or more propellers rotate they generate a thrust force which causes the vehicle to fly. An image sensor (e.g. camera) is mounted on the aerial vehicle; the image sensor (e.g. camera) can be used to capture images. The image sensor (e.g. camera) may take any suitable form; for example, the image sensor (e.g. camera) may be configured to capture still images or the images making up a video.

Referring to FIG. 1b, between time t0 and a first time instant t1 the one or more motors are operating to drive the one or more propellers to rotate; the rotation of the propellers will generate a thrust which will cause the vehicle to fly (in this example to fly at a substantially constant altitude). It should be understood that in the present application the term 'motor' includes electric motors as well as internal combustion engines, which typically cause even more vibrations due to the translational motion of the piston(s). The motor may comprise a rotor and stator, wherein the rotor is moveable with respect to the stator.

At a first time instant t1 a controller provided in the aerial vehicle receives a first command from a user which indicates that the image sensor (e.g. camera) should capture an image. This command may be provided by the user to the controller via a keyboard/control panel/or PC which is in wireless, or wired communication with the controller.

In response to receiving the first command the controller turns off said one or more motors. When the one or more motors are turned off said motors no longer drive the one or more propellers to rotate and the rotation of the one or more propellers will begin to slow; if the one or more motors are turned off for long enough the propellers may eventually slow to a standstill. In most cases the propellers will continue spinning due to aerodynamic torques (windmill effect).

After the one or more motors have been turned off the controller then initiates the image sensor (e.g. camera) which is mounted on the aerial vehicle to capture an image.

At a second time instant t2, which is after the image has been captured using said image sensor (e.g. camera), the controller operates the one or more motors again to drive the one or more propellers to rotate; the rotation of the propellers will generate a thrust which will cause the vehicle to fly.

Advantageously in the above-mentioned embodiment since the motors are turned off when the image sensor (e.g. camera) is capturing an image the image captured by the image sensor (e.g. camera) will have reduced motion blur.

Figure 2:
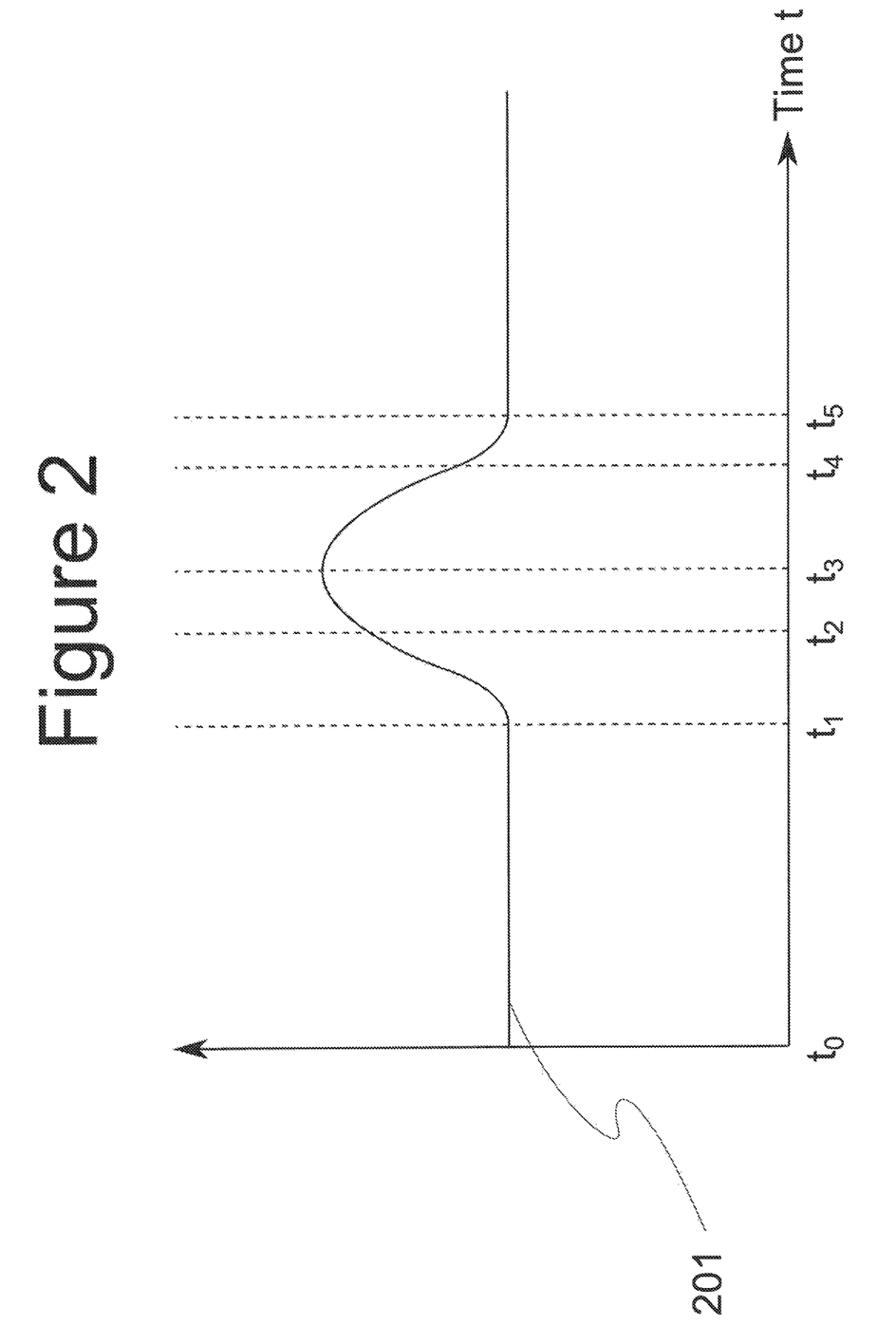
FIG. 2 illustrates the flight path of an aerial vehicle which performs a method of capturing an image using a camera mounted on an aerial vehicle, according to a further embodiment of the present invention.

FIG. 2 illustrates the altitude 201 of an aerial vehicle which performs a method of capturing an image using an imaging sensor (e.g. camera) mounted on an aerial vehicle, according to a further embodiment of the present invention. The aerial vehicle comprises one or more propellers and one or more motors which are selectively operable to drive the one or more propellers; when the one or more propellers rotate they generate a thrust force which causes the vehicle to fly. An imaging sensor (i.e., a camera) is mounted on the aerial vehicle; the imaging sensor can be used to capture images. The imaging sensor may take any suitable form; for example it may be configured to capture still images or the images making up a video. It should be understood that, while in this embodiment the sensor which is used to take a measurement is an imaging sensor which can capture an image, it should be understood that any sensor/measurement means could be used; in other words the embodiment could just as well be applied when used with any other sensor/measurement means.

Referring to FIG. 2, between time to and a first time instant t1 the one or more motors are operating to drive the one or more propellers to rotate; the rotation of the propellers will generate a thrust which will cause the vehicle to fly. In this particular example, between time t0 and the first time instant t1 the vehicle flies at a substantially constant first altitude level; however it will be understood that it is not essential for the vehicle to fly at a substantially constant altitude between time to and the first time instant t1.

At a first time instant t1 a controller provided in the aerial vehicle receives a first command from a user which indicates that the camera should capture an image. This command may be provided by the user to the controller via a keyboard/control panel/or PC which is in wireless, or wired communication with the controller.

In response to receiving the first command the controller operates the one or more motors to increase the speed of rotation of the one or more propellers; said increase in the speed of rotation of the propellers will cause the propellers to generate additional thrust force which causes the vehicle to fly to a higher altitude level (i.e. to an altitude higher than the first altitude level).

At a second time instant t2, which occurs after the first time instant t1 as the propellers are rotating at an increased speed of rotation, the controller turns off said one or more motors. When the one or more motors are turned off said motors no longer drive the one or more propellers to rotate and the rotation of the one or more propellers will begin to slow; if the one or more motors are turned off for long enough the one or more propellers may eventually slow to a standstill.

Importantly, even though the one or more motors have been turned off, the momentum of the vehicle causes the vehicle to continue to increase in altitude. Simultaneously, since the one or more motors have been turned off, the momentum of the vehicle, and thus the vertical velocity (that is, the rate of change of the aerial vehicle's altitude) will decrease; the vehicle will continue moving towards a maximum altitude at which point the vertical velocity of the vehicle will have decreased to zero.

At a third time instant t3 the vehicle will have reached said maximum altitude; at this third time instant t3 the vertical velocity of the vehicle will be zero, or at least will be substantially zero. At the third time instant t3 the controller initiates the camera to capture an image. A sensor may be provided on the vehicle which detects the vertical velocity of the vehicle (i.e. a velocity sensor), thus when the velocity sensor indicates that the vertical velocity is zero or close to zero, the controller can detect that the vehicle has reached said maximum altitude i.e. the third time instant t3 has been reached. In one example, the vehicle comprises a velocity sensor that detects that the speed of the vehicle is zero, and will then send a signal to the controller; the controller initiates the camera to capture an image in response to receiving said signal from the velocity sensor. In this manner the controller can initiate the camera to capture an image at the third time instant t3 when the vertical velocity of the vehicle will be zero, or at least will be substantially zero. In another example the vehicle comprises a position sensor (such as a GPS receiver) that detects the position of the vehicle, and which is used to detect when the vehicle has reached said maximum altitude i.e. the third time instant t3 has been reached; or detects when the vehicle is at another predefined position immediately preceding said maximum altitude. The position sensor will send a signal to the controller when the vehicle is at said maximum altitude or said predefined position; the controller initiates the camera to capture an image in response to receiving said signal from the position sensor. In this manner the controller can initiate the camera to capture an image at the third time instant t3 when the vertical velocity of the vehicle will be zero, or when the vehicle is at said predefined position. In the most preferred embodiment the controller initiates the camera to capture an image before the time instant t3 (or at a predefined position before the vehicle reached said maximum altitude or at a predefined time before the vehicle reaches said maximum altitude). For example, if the shutter of the camera will be opened for 100 ms, then the controller will open the shutter of the camera 50 ms before the third time instant t3 in order to obtain an image with minimal motion.

At a fourth time instant t4, which occurs after the camera has captured an image, the controller operates the one or more motors again to drive the one or more propellers to rotate; the rotation of the propellers will generate a thrust. The controller will define a target speed of rotation for the one or more propellers; in order to counter the downward momentum of the vehicle, at the fourth time instant t4 the controller defines said target speed of rotation for the one or more propellers in excess of the speed of rotation of the one or more propellers required to maintain a substantially constant altitude; the increased speed of the propellers will provide additional lift force necessary to counter the downward momentum of the vehicle; however, since the lift force results in an acceleration acting on the vehicle, the downward momentum of the vehicle may not be instantaneously changed, thus the vehicle will continue to decrease in altitude between the fourth time instant t4 and a fifth time instant t5. However since during the time between the fourth time instant t4 and a fifth time instant t5 the downward momentum is gradually reducing to zero, the rate at which the vehicle drops in altitude slows between the fourth time instant t4 and a fifth time instant t5.

At a fifth time instant t5, the controller operates the one or more motors to rotate the one or more propellers at a rotational speed required to maintain a substantially constant altitude thus generating sufficient lift to maintain the vehicle at a substantially constant altitude.

Advantageously in the embodiment illustrated in FIG. 2 the vehicle will achieve a zero vertical velocity (or at least substantially zero vertical velocity) at said maximum altitude; since the one or more motors are turned off and the vehicle has zero vertical velocity (or at least substantially zero vertical velocity) when the camera is capturing an image, the image captured by the camera will have reduced motion blur.

Referring to FIG. 2, it should be understood that the flight path of the aerial vehicle between the time instant t2 and time instant t4 may be a parabolic trajectory.

For example, a maneuver according to FIG. 2, executed by a multicopter carrying an imaging sensor could be as follows: At time t1=0 s, the total thrust generated by the rotary wings of the multicopter is increased to cause an upwards acceleration of 5 m/s^2. At time t2=0.022 s, the speed of all propellers is reduced to cause a downwards acceleration of 6.7 m/s^2, and the imaging sensor begins conversion of light into electrical signals. The exposure time of the sensor is 1/30 s. At time t3=0.039 s, the aerial vehicle reaches its maximum altitude, which is 2.2 mm above the altitude at time t1. At time t4=0.055 s, the exposure time is elapsed and the imaging sensor stops its conversion; at the same time, the speed of the propellers is increased again to cause an upwards acceleration of 5 m/s^2. At time t5=0.067 s, the aerial vehicle has reached the same altitude as it had at t1 with zero vertical velocity; the speed of the rotary wings may now be set such that no upwards or downwards acceleration is caused, and the aerial vehicle remains at a constant altitude. Advantageously, the reduced speed of the rotary wings will have caused less vibrations and thus less motion blur during the exposure time. The aerial vehicle will have changed altitude by less than 1 mm during the exposure time.

Figure 3:
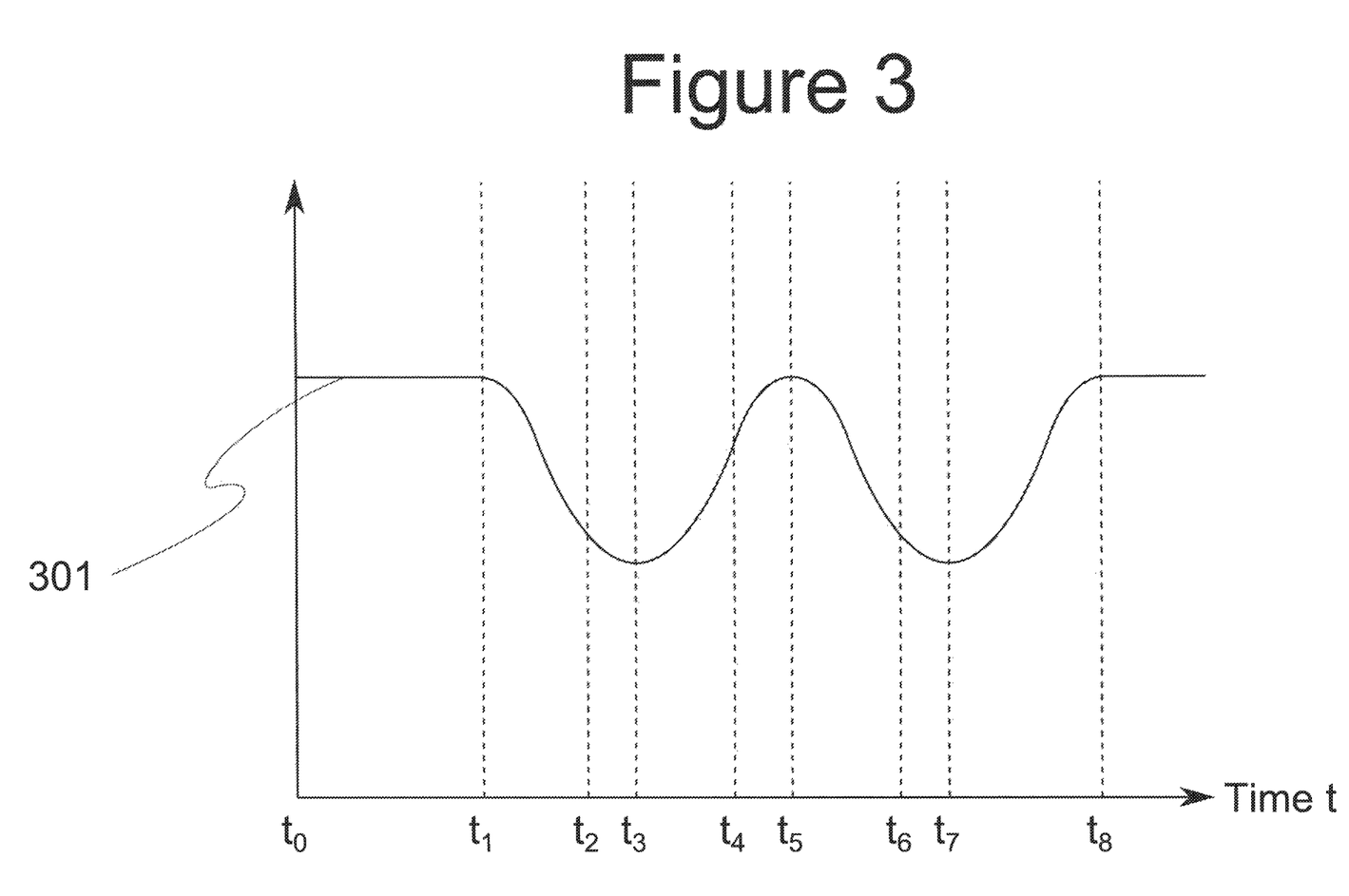
FIG. 3 illustrates the flight path of an aerial vehicle which performs a method of capturing a measurement using a 3D scanner mounted on an aerial vehicle, according to a further embodiment of the present invention.

FIG. 3 illustrates the altitude 301 of an aerial vehicle which performs a method of capturing a measurement using a 3D scanner mounted on an aerial vehicle, according to a further embodiment of the present invention. The aerial vehicle comprises one or more propellers and one or more motors which are selectively operable to drive the one or more propellers; when the one or more propellers rotate they generate a thrust force which causes the vehicle to fly. A 3D scanner is mounted on the aerial vehicle; the 3D scanner can be used to capture a 3D scan, i.e. a measurement comprised of a set of depth measurements for a set of points lying in the field of view of the 3D scanner. The 3D scanner may take any suitable form; for example the 3D scanner may be any type of time of flight sensor, or a LIDAR and the 3D scanner may for example be configured to capture a single measurements or a set of multiple measurements. It should be understood that, while this embodiment is shown/described with a sensor in the form of a 3D scanner mounted to the aerial vehicle, it should be understood that the sensor/measurement means may take any suitable form; in other words this embodiment could just as well be applied to a vehicle which has any other sensor/measurement means.

Referring to FIG. 3, between time t0 and a first time instant t1 the one or more motors are operating to drive the one or more propellers to rotate; the rotation of the propellers will generate a thrust which will cause the vehicle to fly. In this particular example, between time t0 and the first time instant t1 the vehicle flies at a substantially constant first altitude level; however it will be understood that it is not essential for the vehicle to fly at a substantially constant altitude between time to and the first time instant t1.

At a first time instant t1 a controller provided in the aerial vehicle receives a first command from a user which indicates that the 3D scanner should capture a 3D scan. This command may be provided by the user to the controller via a keyboard/control panel/or PC which is in wireless, or wired communication with the controller. In another embodiment the system is fully autonomous, wherein the controller is pre-programmed to initiate the 3D scanner to capture a 3D scan when the vehicle is at a predefined position and/or at a predefined time instant; in this embodiment advantageously the user does not need to send a first command to the controller.

In response to receiving the first command the controller operates the one or more motors to decrease the speed of rotation of the one or more propellers; said decrease in the speed of rotation of the propellers will cause the propellers to generate less thrust force which causes the vehicle to drop in altitude from the first altitude level.

At a second time instant t2, which occurs after the first time instant, the controller operates the one or more motors to increase the speed of rotation of the one or more propellers; in order to counter the downward momentum of the vehicle, at the second time instant t2 the controller defines said target speed of rotation for the one or more propellers in excess of the speed of rotation of the one or more propellers required to maintain a substantially constant altitude; the increased speed of the propellers will provide additional lift force necessary to counter the downward momentum of the vehicle; however, since the lift force results in an acceleration acting on the vehicle, the downward momentum of the vehicle may not be instantaneously changed, thus the vehicle will continue to decrease in altitude between the second time instant t2 and a third time instant t3. However since during the time between the second time instant t2 and a third time instant t3 the downward momentum is gradually decreasing to zero, the rate at which the vehicle drops in altitude slows between the second time instant t2 and a third time instant t3. Eventually the downward momentum reaches zero where the vehicle stops dropping in altitude (at a third time instant t3); subsequently, the controller continues to operate the one or more motors to drive the one or more propellers to rotate at said target speed of rotation that exceeds the speed of rotation required to maintain a substantially constant altitude which causes the vehicle to climb to a higher altitude level (the vehicle begins to climb to a higher altitude from the third time instant t3).

At a fourth time instant t4, which occurs after the vehicle begins to increase in altitude, the controller turns off said one or more motors. When the one or more motors are turned off said motors no longer drive the one or more propellers to rotate and the rotation of the one or more propellers will begin to slow; if the one or more motors are turned off for long enough the one or more propellers may eventually slow to a standstill.

Importantly, even though the one or more motors have been turned off, the momentum of the vehicle causes the vehicle to continue to increase in altitude. Simultaneously, since the one or more motors have been turned off, the momentum of the vehicle, and thus the vertical velocity of the vehicle will decrease; the vehicle will continue moving towards a maximum altitude at which the vertical velocity of the vehicle has decreased to zero.

At a fifth time instant t5, the vehicle will have reached said maximum altitude; at this fifth time instant t5 the vertical velocity of the vehicle will be zero, or at least will be substantially zero. At the fifth time instant t5 the controller initiates the 3D scanner to capture a 3D scan. As discussed in the description of FIG. 2, a velocity sensor and/or position sensor can be used to detect when the vehicle is at said maximum altitude where its vertical velocity is zero. In one example, the vehicle comprises a velocity sensor which can measure the vertical velocity at which the vehicle is travelling; when the velocity sensor detects that the vertical velocity of the vehicle is zero or close to zero, it will send a signal to the controller; the controller initiates the 3D scanner to capture a 3D scan in response to receiving said signal from the velocity sensor. In this manner the controller can initiate the 3D scanner to capture a 3D scan at the fifth time instant t5 when the vertical velocity of the vehicle will be zero, or at least will be substantially zero. In another example the vehicle comprises a position sensor (such as a GPS receiver) that detects the position of the vehicle, and which is used to detect when the vehicle has reached said maximum height i.e. the fifth time instant t5 has been reached; or detects when the vehicle is at another predefined position immediately preceding said maximum altitude. The position sensor will send a signal to the controller when the vehicle is at said maximum altitude or said predefined position; the controller initiates the 3D scanner to capture a 3D scan in response to receiving said signal from the position sensor. In this manner the controller can initiate the 3D scanner to capture a 3D scan at the fifth time instant t5 when the vertical velocity of the vehicle will be zero, or when the vehicle is at said predefined position. In a further variation of this embodiment the controller initiates the 3D scanner to capture a 3D scan before the fifth time instant (t5).

In this embodiment illustrated in FIG. 3 said maximum altitude corresponds to the first altitude level. This is achieved by choosing the appropriate target rotational speed for the propellers at the second time instant t2 and choosing the appropriate times for the third t3 and fourth t4 time instances (preferably the target rotational speed for the propellers at the second time instant t2 is a predefined target rotational speed; and the appropriate times for the third t3 and fourth t4 time instances are predefined respective time instances). However it will be understood that it is not essential that the said maximum altitude corresponds to the first altitude; indeed said maximum altitude could occur at any altitude.

At a sixth time instant t6, which occurs after the 3D scanner has captured a 3D scan, the controller operates the one or more motors to increase the speed of rotation of the one or more propellers; in order to counter the downward momentum of the vehicle, at the sixth time instant t6 the controller defines said target speed of rotation for the one or more propellers in excess of the speed of rotation of the one or more propellers required to maintain a substantially constant altitude; the increased speed of the propellers will provide additional lift force necessary to counter the downward momentum of the vehicle; however, since the lift force results in an acceleration acting on the vehicle, the downward momentum of the vehicle may not be instantaneously changed, thus the vehicle will continue to decrease in altitude between the sixth time instant t6 and a seventh time instant t7. However during the time between the sixth time instant t6 and a seventh time instant t7 the downward momentum is gradually decreasing to zero, therefore the rate at which the vehicle drops in altitude slows between the sixth time instant t6 and a seventh time instant t7. Eventually the downward momentum reaches zero momentum where the vehicle stops dropping in altitude (at a seventh time instant t7); subsequently, the controller continues to operate the one or more motors to drive the one or more propellers to rotate at said target speed of rotation that exceeds the speed of rotation required to maintain a substantially constant altitude which causes the vehicle to climb to a higher altitude level (the vehicle begins to climb to a higher altitude from the seventh time instant t7).

As mentioned from the seventh time instant t7 the speed of rotation of the one or more propellers exceeds the speed of rotation of the one or more propellers required to maintain a substantially constant altitude causes the vehicle to increase in altitude i.e. to fly to a higher altitude level. In this example the controller continues to operate the one or more motors to drive the propellers to rotate at said speed of rotation that exceeds the speed of rotation of the propellers required to maintain a substantially constant altitude until an eighth time instant t8, which is shortly before the vehicle has reached a predefined altitude. In this example the predefined altitude corresponds to the first altitude level. However, it should be noted that said predefined altitude may not be identical to the first altitude at time t1.

At an eighth time instant t8 the upward momentum of the vehicle causes the vehicle to climb in altitude; however, after the time instant t8, the controller operates the one or more motors to rotate the one or more propellers at a rotation speed that is smaller than the speed of rotation of the one or more propellers required to maintain a substantially constant altitude; since said rotation speed causes the vehicle to produce less lift than required to maintain a substantially constant altitude the upward momentum is gradually decreasing to zero, therefore the rate at which the vehicle climbs in altitude slows between the eight time instant t8 and a ninth time instant t9.

At a ninth time instant t9 the controller operates the one or more motors to rotate the one or more propellers at a rotational speed required to maintain a substantially constant altitude thus generating sufficient thrust to maintain the vehicle at a substantially constant altitude.

The embodiment described with respect to FIG. 3 achieves the same advantages as the embodiment described with respect to FIG. 2; in addition, since the vehicle undergoes a reduction in altitude prior to reaching said maximum altitude, the measurement can be captured at an altitude level close to the altitude level which the vehicle was at when the controller received the first command.

Referring to FIG. 3, it should be understood that the flight path of the aerial vehicle between the time instant t4 and time instant t6 may be a parabolic trajectory.

Figure 4:
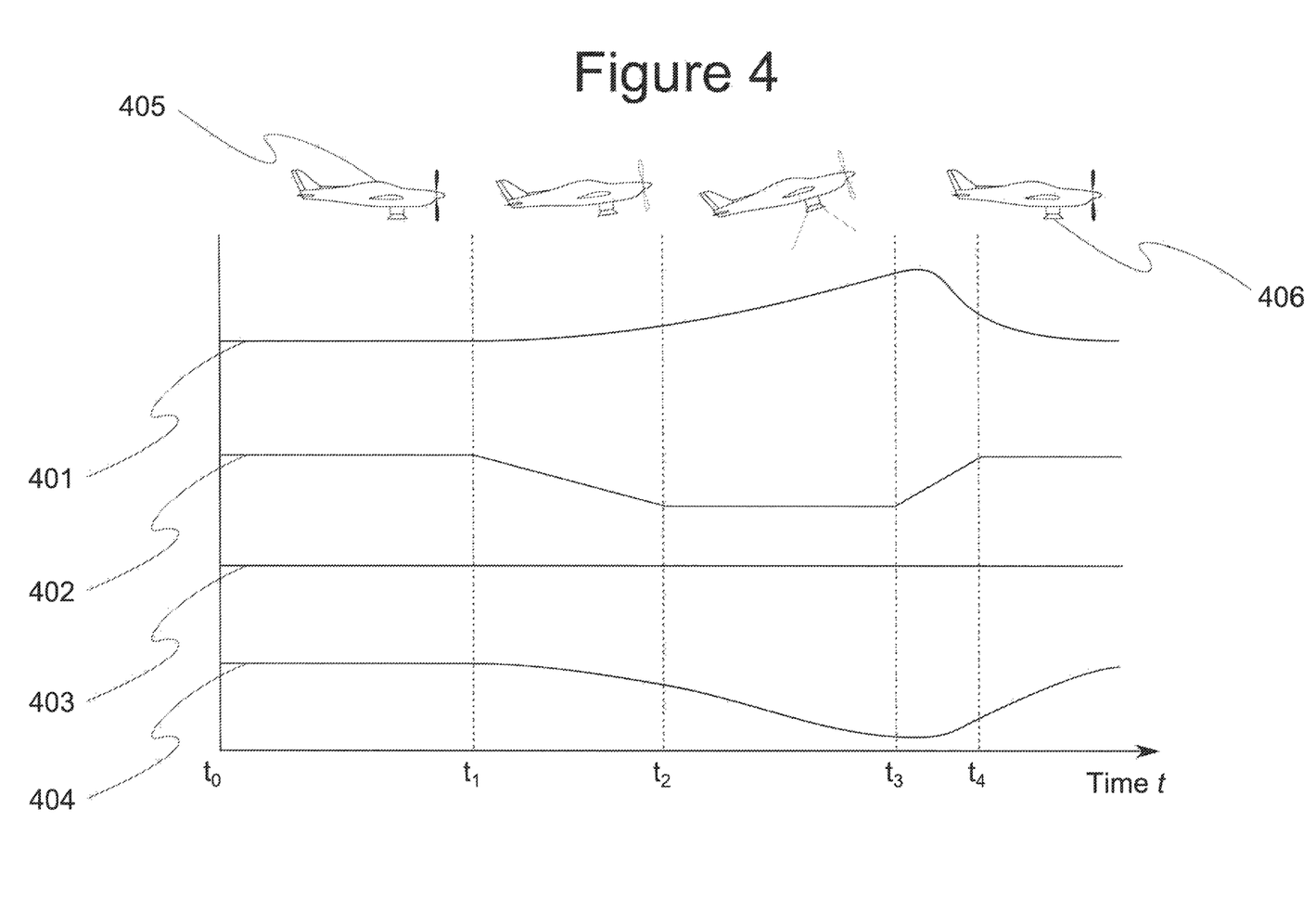
FIG. 4 illustrates the flight altitude, propeller speed, flight speed, and angle of attack of a fixed-wing aerial vehicle which performs a method of capturing an image according to an embodiment of the present invention.

FIG. 4 illustrates the flight altitude 403, propeller speed 402, flight speed 404, and angle of attack 401 of a fixed-wing aerial vehicle 405 which performs a method of capturing an image using an imaging sensor (such as a camera) 406 mounted on the fixed-wing aerial vehicle, according to an embodiment of the present invention. It should be understood that this embodiment is not limited to requiring an imaging sensor (such as a camera) 406 to capture an image, and that any other suitable sensor/measurement means which captures a measurement, can be used.

In this example said fixed-wing aerial vehicle comprises a single motor, a main wing, and three or more elevons. However it should be understood that the fixed-wing aerial vehicle may take any suitable form. Said motor is operable to produce a torque which, in turn, results in the propeller to spin which, in turn, results in an acceleration of the vehicle along the direction of the axis of rotation of the propeller. Said main wing is designed to produce a lift force due to the air flow resulting from forward motion of said aerial vehicle with respect to the surrounding air which, at a certain minimum forward velocity, said lift force is in excess of the force resulting from gravitational acceleration acting on said vehicle. In addition, said motor and propeller is capable of producing a thrust that is sufficient to accelerate said aerial vehicle to at least said minimum forward velocity; typically in excess of said minimum forward velocity. Said three or more elevons of said aerial vehicle, are selectively operable to introduce a torque on said aerial vehicle in any spatial direction causing said aerial vehicle to change its orientation; in this example said three or more elevons comprise at least two independent elevons that can be operated to control the pitch and roll angle of the vehicle and one rudder that can be operated to control the yaw angle of the vehicle. The camera may take any suitable form; for example, the camera may be configured to capture still images or the images making up a video.

It should be understood that, while this embodiment is described as having an imaging sensor (which in this example is defined by a camera) 406, which is used to capture an image, any other sensor/measurement means which can be used to take a measurement can be used instead of, or in addition to, said imaging sensor.

Referring to FIG. 4, between time t0 and a first time instant t1 the motor is operating to drive the propeller to rotate; the rotation of the propeller will generate a thrust which will cause the vehicle to fly forward (in this example at a substantially constant flight speed); the forward flight will cause the vehicle to move with respect to the surrounding air which results in an airflow across the main wing and the three or more elevons; the airflow across the main wing results in a lift force which causes the vehicle to fly (in this example to fly at a substantially constant altitude). In this example, the three or more elevons are operated such that the vehicle maintains a substantially constant orientation; specifically the three or more elevons are operated such that the angle of attack of the aerial vehicle remains substantially constant. However, it will be understood that it is not essential for the vehicle to fly at a substantially constant orientation between time t0 and the first time instant t1.

At a first time instant t1 a controller provided in the aerial vehicle receives a first command from a user which indicates that the camera should capture an image. This command may be provided by the user to the controller via a keyboard/control panel/or PC which is in wireless or wired communication with the controller. In another embodiment the system is fully autonomous, wherein the controller is pre-programmed to initiate the camera to capture an image when the vehicle is at a predefined position and/or at a predefined time instant; in this embodiment advantageously the user does not need to send a first command to the controller.

In response to receiving the first command the controller turns off said motor. When said motor is turned off said motor no longer drives the propeller to rotate and the rotation of the propeller will begin to slow; the decrease in the speed of rotation of the propeller leads to a decrease in thrust; in turn, the decrease in thrust results in a decreasing flight speed. If the one or more motors are turned off for long enough the propellers may eventually slow to a standstill (however it should be understood that it is not essential in the present invention that the motors come to a standstill). In most cases the propeller will continue spinning due to aerodynamic torques (windmill effect).

Importantly, even though the motor has been turned off, the momentum of the vehicle causes the vehicle to continue moving forward. At a substantially constant angle of attack, the decrease in flight speed would lead to a decrease in lift produced by the main wing which would lead to a decrease in altitude; however, in this example, the controller operates said three or more elevons to gradually increase the angle of attack such that the lift force produced by the main wing remains substantially constant, and thus the altitude remains substantially constant.

At a second time instant t2 the controller initiates the camera to capture a single or multiple images (or in the case that the vehicle has a sensor/measurement means which can take a measurement, the controller initiates the sensor/measurement means to take a measurement). Said time instant t2 may chosen to occur after a predefined amount of time after the time instant t1. In another embodiment of the present invention, the time instant t2 depends on the speed of rotation of the propeller; specifically, the time instant t2 may be defined as the time when the speed of rotation of the propeller has reached or has dropped below a predefined threshold value (which may be zero); said predefined threshold value may be determined by choosing a maximum allowed vibration magnitude such that a certain image quality is achieved, and then experimentally determining the propeller rotation speed that does not exceed said maximum allowed vibration magnitude.

Advantageously in the embodiment illustrated in FIG. 4 of the present invention since the motor is turned off when the camera is capturing an image the image captured by the camera will have reduced motion blur.

At a third time instant t3, which is after the image has been captured using said camera (or after the sensor/measurement means has takes a measurement), the controller operates the motor again to drive the propeller so that they increase their speed of rotation to a target speed of rotation (said target speed of rotation being defined by said controller); the rotation of the propeller will generate a thrust which will cause the vehicle to accelerate forward which causes the flight speed to increase. At a substantially constant angle of attack, the increase in flight speed leads to a increase in lift produced by the main wing; however, in this example, the controller operates said three or more elevons to gradually increase the angle of attack such that the lift force produced by the main wing remains substantially constant, and thus the altitude remains substantially constant. Since at the third time instant t3, the propeller is beginning rotation from a standstill (or from a slow rotation), it will take some time before the propeller reaches said target speed of rotation as defined by the controller; therefore the speed of rotation of the propellers will increase from zero to said target speed of rotation between the third time instant t3 and a fourth time instant t4. At the fourth time instant t4 the propellers will be rotating at said target speed of rotation defined by the controller. Said third time instant t3 may be chosen to occur immediately after an image has been captured using said camera (or after the measurement has been taken by the sensor/measurement means); in another embodiment of the present invention, the third time instant t3 can be chosen to maximize the time between the second time instant t2 and third time instant t3 such that for example multiple images can be captured by the camera (or multiple measurements can be taken by the sensor/measurement means) between the second time instant t2 and third time instant t3.

Although not explicitly required by the method disclosed herein, it should be understood that the third time instant t3 should typically be chosen to occur before a critical time instant at which the flight speed of the aerial vehicle drops below a threshold speed required for maintaining a stable lift force (if the flight speed drops below said threshold, the aerial vehicle would experience a stall). Said threshold may be determined by physical modelling, flight experiments and/or numerical simulation of the aerial vehicle.

After the fourth time instant t4, the aerial vehicle will continue to accelerate until it reaches the steady-state forward velocity at which the aerodynamic drag acting on the vehicle cancels the thrust produced by the propeller.

In another embodiment, the additional step of increasing the speed of rotation of the propeller before decreasing speed of rotation of the propeller thereafter is taken after the first time instant t1 and before the second time instant t2 so as to increase the forward momentum of the vehicle and thus increasing the time interval between the second time instant t2 and said critical time instant at which the flight speed of the aerial vehicle drops below a threshold required for maintaining a stable lift force. This embodiment advantageously allows to increase the time interval within which measurements may be taken while reducing the risk of experiencing a stall.

Figure 5:
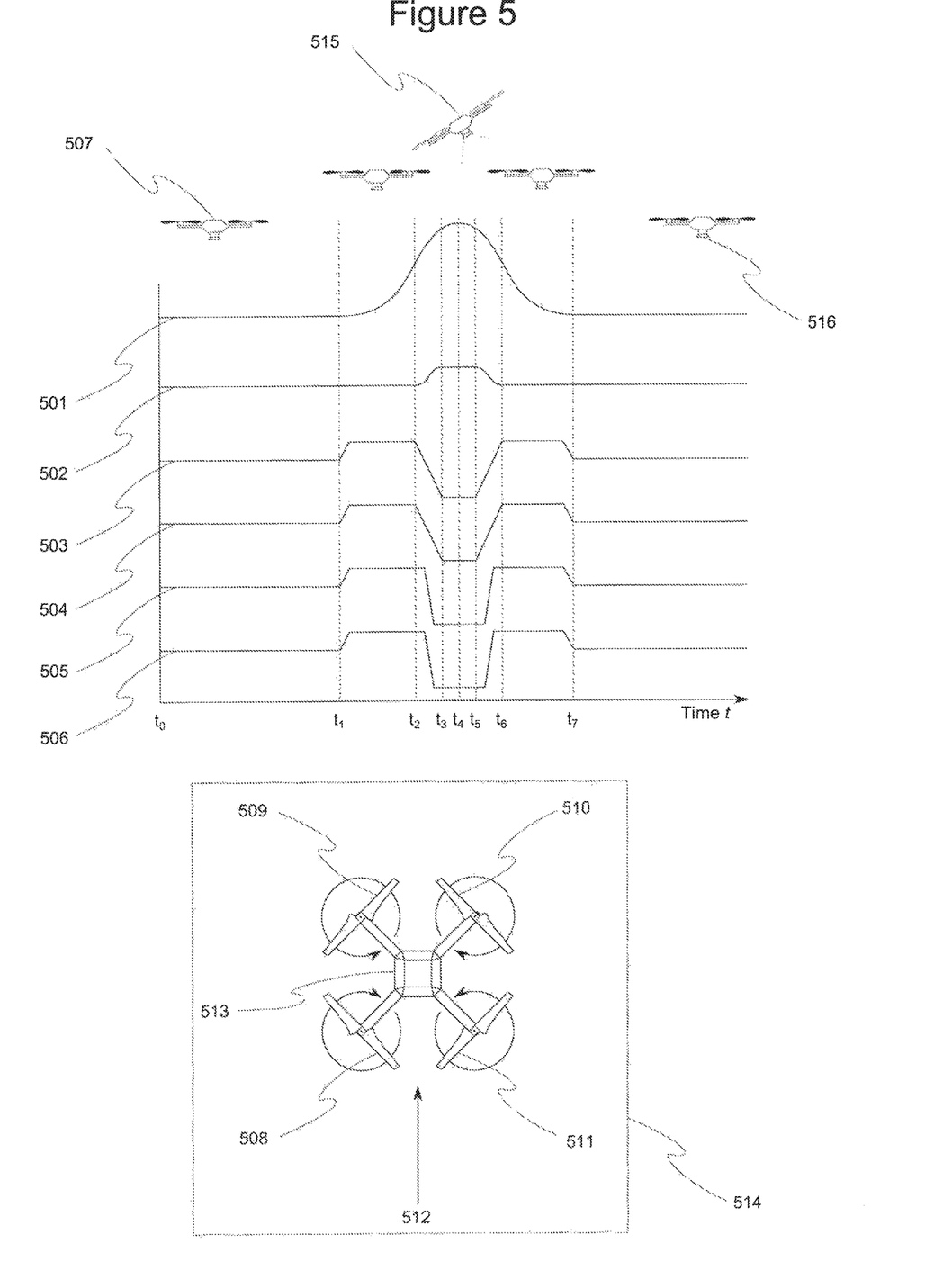
FIG. 5 illustrates the flight altitude, orientation, rotation speeds of rotary wings, of a multicopter which performs a method of capturing an image using a camera mounted on the multicopter, according to an embodiment of the present invention; and also provides a top view and side views of said multicopter.

FIG. 5 illustrates a multicopter which performs a method of capturing an image using an imaging sensor, which in this example is defined by a camera 516 mounted on the multicopter, according to an embodiment of the present invention.

It should be understood that, while this embodiment is described as having an imaging sensor, which in this example is defined by a camera 516, which is used to capture an image, any other sensor/measurement means which can be used to take a measurement can be used instead of, or in addition to, said imaging sensor.

In this example the multicopter is a quadcopter comprising a main body 513 and four motors with four rotary wings 508, 509, 510, 511 attached thereon and that are selectively operable to rotate. Said motors are configured such that two of said four rotary wings (i.e. 508 and 510) located at the opposite ends of said main body are operable to rotate in clockwise direction, and such that the remaining two of said four rotary wings (i.e. 509 and 511) are operable to rotate in counter-clockwise direction. However it should be understood that the multicopter may take any suitable form.

A top view of said quadcopter 512, and a side view is illustrated in 507 where the direction of said side view with respect to the top view is defined by the direction 512. It should be noted that the method of this embodiment may be applied to any type of multicopter having any type of sensor/measurement means which can capture a measurement or image, without departing from the scope of the invention as defined in the appended claims; for example the multicopter may comprise six/eight motors with six/eight rotary wings attached thereon and that are selectively operable to rotate. It should further be understood that, while this embodiment is shown with a camera mounted to the aerial vehicle, the embodiment could just as well be adapted to other sensor/measurement means.

FIG. 5 further illustrates the evolution of the flight altitude 501, the quadcopter orientation 502 (specifically the angle of rotation of said quadcopter around the axis defined by 512), the rotation speed 503 of rotary wing 508, the rotation speed 504 of rotary wing 509, the rotation speed 505 of rotary wing 510, and the rotation speed 506 of rotary wing 511 over time for said quadcopter which performs a method of capturing an image using a camera mounted on the quadcopter, according to an embodiment of the present invention. As mentioned any other sensor/measurement means which can be used to take a measurement can be used instead of, or in addition to, said imaging sensor (defined by a camera 516). It should be understood that the same flight altitude 501, orientation 502 (specifically the angle of rotation of said quadcopter around the axis defined by 512), the rotation speed 503 of rotary wing 508, the rotation speed 504 of rotary wing 509, the rotation speed 505 of rotary wing 510, and the rotation speed 506 of rotary wing 511 over time, is followed by said quadcopter which performs a method of capturing an measurement using a sensor/measurement means mounted on said quadcopter, according to an embodiment of the present invention; but instead of capturing an image with the camera 516 the sensor/measurement means takes a measurement.

Referring to FIG. 5, between time t0 and a first time instant t1 the four motors are operating to drive the four rotary wings to rotate; the rotation of the rotary wings will generate a lift which will cause the vehicle to fly. In this particular example, between time t0 and the first time instant t1 the vehicle flies at a substantially constant first altitude level; however it will be understood that it is not essential for the vehicle to fly at a substantially constant altitude between time t0 and the first time instant t1.

At a first time instant t1 a controller provided in the aerial vehicle receives a first command from a user which indicates that the camera should capture an image (or in the case the multicopter has other sensor/measurement means which can be used to take a measurement, said first command may indicate the sensor/measurement means to take a measurement). This first command may be provided by the user to the controller via a keyboard/control panel/or PC which is in wireless or wired communication with the controller. In another embodiment the system is fully autonomous, wherein the controller is pre-programmed to initiate the camera to capture an image (and/or to initiate the sensor/measurement means(s) to take a measurement) when the vehicle is at a predefined position and/or at a predefined time instant; in this embodiment advantageously the user does not need to send a first command to the controller.

In response to receiving the first command the controller operates the four motors to increase the speed of rotation of the four rotary wings to a rotation speed which is greater than the rotation speed required to maintain the vehicle at a substantially constant altitude; said increase in the speed of rotation of the rotary wings will cause the rotary wings to generate additional lift force which causes the vehicle to fly to a higher altitude level (i.e. to an altitude higher than the first altitude level).

At a second time instant t2, which occurs after the first time instant t1 as the four rotary wings are rotating at an increased speed of rotation, the controller configures the motors that are operable to drive rotary wings 508 and 509 to rotate such that the speed of rotation of rotary wings 508 and 509 decreases gradually to a predefined low target rotation speed (which may be zero). Shortly thereafter, i.e. after a predefined time interval (which is smaller than the interval between the second time instant t2 and a third time instant t3; in this example about 30% of the time interval between the second time instant t2 and a third time instant t3), the controller configures the motors that are operable to drive rotary wings 510 and 511 to rotate such that the speed of rotation of rotary wings 510 and 511 decreases gradually to said predefined low target rotation speed at a rate of decrease that is faster than the rate of decrease in the speed of rotation of rotary wings 508 and 509; the different rate of decrease in speed of rotation of the rotary wings 508 and 509 compared to the rate of decrease in speed of rotation of the rotary wings 510 and 511 will result in a first time interval in which the speed of rotation of rotary wings 510 and 511 is greater than the speed of rotation of rotary wings 508 and 509, and in a second time interval in which the speed of rotation of rotary wings 510 and 511 is smaller than the speed of rotation of rotary wings 508 and 509; the momentary difference in lift forces produced by the rotary wings 508 and 509 compared to the rotary wings 510 and 511 during said first time interval will cause a momentary negative torque around the axis 512; said momentary negative torque will cause the vehicle to accelerate in rotation around the axis 512; the acceleration in rotation around axis 512 will cause the vehicle to build up angular momentum which will result in a change of orientation; the momentary difference in lift forces produced by the rotary wings 508 and 509 compared to the rotary wings 510 and 511 during said second time interval will cause a momentary positive torque around the axis 512; said momentary positive torque will cause the vehicle to decelerate in rotation around the axis 512; the deceleration in rotation around axis 512 will cause the vehicle to reduce its angular momentum to zero which will stop the change of orientation; at a third time instant t3 the vehicle will however remain at an orientation that is different from the orientation at time t0, the first time instant t1 and the second time instant t2. After said first and second time interval i.e. at a third time instant t3, all four motors have reached said low target rotation speed; if said low target rotation speed is zero the four rotary wings will be at standstill after said first and second time interval. In this example both said first time interval and said second time interval are each 50% of the time between the second time instant t2 and a third time instant t3.

Importantly, even though the four motors have been turned off, the momentum of the vehicle causes the vehicle to follow a parabolic trajectory. When the four motors have been turned off, the vehicle will continue moving towards the maximum altitude along said parabolic trajectory.

At a fourth time instant t4 the vehicle will have reached maximum altitude along said parabolic trajectory; at this fourth time instant t4 the vertical velocity of the vehicle will be zero, or at least will be substantially zero; in addition, the vehicle will be an orientation 515 that is different from the orientation at time to, the first time instant t1 and the second time instant t2. At the fourth time instant t4 the controller initiates the camera to capture an image (and/or in the case the multicopter has sensor/measurement means which can be used to take a measurement, at the fourth time instant t4 the controller initiates the sensor/measurement means to take a measurement). A sensor may be provided on the vehicle which detects the vertical velocity of the vehicle (i.e. a velocity sensor), thus when the velocity sensor indicates that the vertical velocity is zero or close to zero the controller can detect that the vehicle has reached the maximum altitude along said parabolic trajectory i.e. fourth time instant t4 has been reached. In one example, the vehicle comprises a velocity sensor which detects that the speed of the vehicle is zero, and will then send a signal to the controller; the controller initiates the camera to capture an image (and/or in the case the multicopter has sensor/measurement means, initiates the sensor/measurement means to take a measurement) in response to receiving said signal from the velocity sensor. In this manner the controller can initiate the camera to capture an image at the fourth time instant t4 when the vertical velocity of the vehicle will be zero, or at least will be substantially zero.

At a fifth time instant t5, which occurs after the camera has captured an image (and/or in the case the multicopter has sensor/measurement means, after the sensor/measurement means has take a measurement), the controller configures the motors that are operable to drive rotary wings 508 and 509 to rotate such that the speed of rotation of rotary wings 508 and 509 increases gradually to a high target rotation speed; said high target speed of rotation is selected to counter the downward momentum of the vehicle, at the fifth time instant t5 the controller defines said target speed of rotation for the four rotary wings in excess of the speed of rotation of the four rotary wings required to maintain a substantially constant altitude. Shortly thereafter, i.e. after a predefined time interval (which is smaller than the interval between the fifth time instant t5 and a sixth time instant t6; in this example about 30% of the time interval between the fifth time instant t5 and a sixth time instant t6), the controller configures the motors that are operable to drive rotary wings 510 and 511 to rotate such that the speed of rotation of rotary wings 510 and 511 increases gradually to said high target rotation speed at a rate of increase that is faster than the rate of increase in the speed of rotation of rotary wings 508 and 509; the different rate of increase in speed of rotation of the rotary wings 508 and 509 compared to the rate of increase in speed of rotation of the rotary wings 510 and 511 will result in a first time interval in which the speed of rotation of rotary wings 510 and 511 is smaller than the speed of rotation of rotary wings 508 and 509, and in a second time interval in which the speed of rotation of rotary wings 510 and 511 is greater than the speed of rotation of rotary wings 508 and 509; the momentary difference in lift forces produced by the rotary wings 508 and 509 compared to the rotary wings 510 and 511 during said first time interval will cause a momentary positive torque around the axis 512; said momentary positive torque will cause the vehicle to accelerate in rotation around the axis 512; the acceleration in rotation around axis 512 will cause the vehicle to build up angular momentum which will result in a change of orientation; the momentary difference in lift forces produced by the rotary wings 508 and 509 compared to the rotary wings 510 and 511 during said second time interval will cause a momentary negative torque around the axis 512; said momentary negative torque will cause the vehicle to decelerate in rotation around the axis 512; the deceleration in rotation around axis 512 will cause the vehicle to reduce its angular momentum to zero which will stop the change of orientation; at a sixth time instant t6 the vehicle will have returned to an orientation that is equal to the orientation at time t0, the first time instant t1 and the second time instant t2. After said first and second time interval i.e. at a sixth time instant t6, all four motors have reached said high target rotation speed. In this example both said first time interval and said second time interval are each 50% of the time between the fifth time instant t5 and a sixth time instant t6.

At a sixth time instant t6, the controller continues to operate the four motors to drive the four rotary wings to rotate at said high target rotation rate; the increased speed of the rotary wings will provide additional lift force necessary to counter the downward momentum of the vehicle; however, since the lift force results in an acceleration acting on the vehicle, the downward momentum of the vehicle may not be instantaneously changed, thus the vehicle will continue to decrease in altitude between the sixth time instant t6 and a seventh time instant t7. However since during the time between the sixth time instant t6 and a seventh time instant t7 the downward momentum is gradually decreasing to zero, the rate at which the vehicle drops in altitude slows between the sixth time instant t6 and a seventh time instant t7.

At a seventh time instant t7, the controller operates the four motors to rotate the rotary wings at a rotational speed required to maintain a substantially constant altitude thus generating sufficient lift to maintain the vehicle at a substantially constant altitude.

The embodiment described with respect to FIG. 5 achieves the same advantages as the embodiment described with respect to FIG. 2; in addition, an additional step of changing the orientation of the vehicle prior to turning off the motors and following along its parabolic trajectory allows to point the camera (and/or sensor/measurement means) attached to the vehicle to be orientated in an arbitrary way without the need of additional hardware such as, for example, gimbals.

Referring to FIG. 5, it should be apparent to those skilled in the art that for example the change in orientation between the time instants t2 and t3, as well as between the time instant t5 and t6 may be achieved through feedback control methods (such as PID control, LQR, feedback linearization, nonlinear control etc.) without departing from the scope of the invention as defined in the appended claims.

As mentioned throughout this description while many of the embodiments are described as having an imaging sensor e.g. a camera, which is used to capture an image, any other sensor/measurement means which can be used to take a measurement can be used instead of, or in addition to, said imaging sensor. In this case instead of, or in addition to, the attached imaging sensor, the aerial vehicle comprises a sensor/measurement means which can take a measurement(s). In this embodiment, the flight path of an aerial vehicle may correspond to the flight paths described above with respect to FIGS. 1-5, but a step of taking a measurement using the sensor/measurement means is performed in place of, or in addition to, the step of capturing an image using said camera mounted on an aerial vehicle. It should be understood that said sensor/measurement means may take any suitable form; for example said sensor/measurement means may comprise any one or more of an ultrasonic sensor, a microphone, a magnetic field sensor, or a laser-based sensor.

It will be understood that the aerial vehicle may take any suitable form. In the most preferred embodiment the aerial vehicle will comprise at least one propeller which is used for flight. The aerial vehicle may comprise a plurality of propellers which are used for flight (e.g. a multicopter). In another example the aerial vehicle may comprise one or more propellers which are used for flight and one or more elevons and/or one or more flaps. In another example the aerial vehicle may further comprise one or more wings that generate lift forces caused by the vehicle's forward airspeed and the shape of the one or more wings. Vehicles equipped with such lift-generating wings are referred to as fixed-wing aerial vehicles. It will be understood that if the aerial vehicle comprises one or more propellers and one or more wings then the vehicle may undergo a period of gliding using the one or more wings, during the time when the one or more motors which operate the one or more propellers are turned off (i.e. when the propellers are not rotating).

In the some of the above presented embodiments the controller may turn off the one or more motors simply by preventing current from flowing through the electric motor. Disconnecting the one or more motors from the electric supply ensures that no power is provided by the one or more motors to the one or more propellers and the propellers reduce their speed and may eventually come to a standstill. It should be understood that the one or more motors may be combustion engines or any other types of motors; and the appropriate steps would be taken to turn off those respective motors or to slow down those respective motors.

In another embodiment the controller may turn off the one or more motors by rheostatic braking using braking resistors or the winding resistance of the motors. This rheostatic braking slows the propellers more quickly.

It should be noted that in the present invention, one or several of the one or more propellers may be configured to generate lift forces (that is, thrust forces opposing gravity). Propellers generating lift forces are frequently referred to as rotary wings, and are typically configured such that their axis of rotation is approximately vertical (that is, approximately aligned with gravity) during flight.

It should be noted that in the present invention, one or several of the one or more propellers may be configured to generate forward thrust forces (that is, thrust forces opposing drag in forward motion). Propellers generating lift forces typically contribute little to the lift forces causing the aerial vehicle to fly, and are typically configured such that their axis of rotation is approximately horizontal (that is, orthogonal to gravity) during flight. If the motor operable to spin the propeller is mounted behind the propeller (as seen during forward flight), such propellers are commonly referred to as "tractor" or "puller" propellers, while they are commonly referred to as "pusher" propellers if the motor is mounted ahead of the propeller.

In the invention, the one or more motors operable to spin the one or more propellers may be any one, or any combination of multiple, machines that convert one form of energy into mechanical energy. In some embodiments, one or several of the one or more motors may be internal combustion engines (for example two-stroke spark ignition engines, four stroke compression ignition engines, or jet engines). In some embodiments, one or several of the one or more motors may be electric motors. In some embodiments, the electric motors may be brushless direct current (brushless DC, BLDC) motors, advantageously providing high power at low weight and precise electronic control.

It should be understood that the motors may be slowed down or turned off by active braking of the one or more motors. Active braking of the motors includes, for example, any one or more of, providing a short circuit in electric motors, increasing pitch on a variable pitch propeller, sending motor brake commands, or rheostatic braking etc. or applying any other suitable braking mechanisms which can be selectively applied to the motor to slow its speed or to stop the motor entirely thereby turning off the motor. Advantageously, active braking allows a faster reduction of the propeller speed than if the propeller is only slowed by its drag torque, which reduces the overall duration of the method and reduces the amount of energy lost by the aerial vehicle during the maneuver.

Preferably, the active braking of electric motors is performed through generative braking, i.e. by operating the motor as a generator and storing the generated electrical energy in an energy storage (typically a battery which powers the motors when the motors are being driven). Advantageously, generative braking allows the recuperation of some of the kinetic energy of the motor and propeller by converting it back to electrical energy, making the execution of the method more energy-efficient.

In some embodiments when the controller turns off the one or more motors the rotational kinetic energy which the rotating propellers have will be dissipated into heat or motion of the medium surrounding the propellers. In a further embodiment this rotational kinetic energy which the one or more propellers have after the one or more motors have been turned off, is harnessed through generative braking and is later used.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

For example, in the above-mentioned examples illustrated in FIGS. 1-5 it is disclosed that the motors are turned off; it should be understood that for all of the above-mentioned examples, instead of 'turning off' the one or more motors the one or more motors may instead be 'slowed down'. For example, the speed of the one or more motors may be reduced by 20%, 50%, 80% (or by any other predefined amount). In one example, the motor may comprise a rotor and stator, wherein the rotor is moveable (e.g. can rotate) with respect to the stator; the steps described with respect to FIGS. 1-5 are performed except instead of turning off the motors, the motors are slowed down; in this example the motors are slowed down by reducing the speed of rotation of the rotor. The slowing down of a motor which operates a propeller on the vehicle will, for example reduce the speed of rotation of the propeller; preferably the speed of the motor is reduced so that the speed of rotation of the propeller is reduced to a speed whereby the vibrations generated by the rotation of the propeller are less than a threshold amount of vibrations; wherein the threshold amount of vibrations are the amount of vibrations above which will compromise the quality of an image captured by a camera on the vehicle (e.g. cause blurring to occur in the image), and/or compromise the quality of measurements taken by a sensor/measurement means of the vehicle.

In the above-mentioned examples illustrated in FIGS. 1-5 it is disclosed that the controller provided in the aerial vehicle receives a first command from a user which indicates that the camera should capture an image; it should be understood that for all of the above-mentioned examples, instead of receiving a first command from a user, the system is fully autonomous, wherein the controller of the vehicle is pre-programmed to initiate (automatically) the measurement means to take a measurement when the vehicle is at a predefined position and/or at a predefined time instant; in such an embodiment advantageously the controller does not need to receive a command from the user.

The invention claimed is:

1. A method of taking a measurement using a sensor mounted on an aerial vehicle, wherein said aerial vehicle is a fixed-wing aerial vehicle, and wherein said sensor is operable to take a measurement of an object other than the aerial vehicle, the aerial vehicle having one or more propellers and one or more motors which are selectively operable to spin the one or more propellers to rotate to cause the vehicle to fly, and a sensor mounted on the aerial vehicle, wherein the aerial vehicle further comprises a controller which is operably connected to the one or more propellers and the sensor, the method comprising the steps of, operating the one or more motors to rotate the one or more propellers at a speed that is sufficient to cause the vehicle to fly;

detecting when a predefined condition is fulfilled, and/or, receiving a command at the controller;

at a first time instant, the controller effects slowing down said one or more motors so as to reduce the speed at which said one or more propellers rotate, in response to detection that the predefined condition is fulfilled and/or in response to receiving a command at the controller;

at a second time instant maintaining the aerial vehicle at a substantially constant altitude using lift force provided by the fixed-wing, for a time duration;

while the aerial vehicle is maintained at said substantially constant altitude, the controller effects the sensor to take a measurement of an object other than the aerial vehicle, during said time duration;

detecting at the controller when the sensor has taken said measurement, and at a third time instant, which is after the measurement has been taken by the sensor, the controller effects operating the one or more motors again to rotate the one or more propellers at a speed that is sufficient to cause the vehicle to fly, in response to detecting that the sensor has taken said measurement.

2. The method according to claim 1, wherein said one or more motors are electric motors.

3. The method according to claim 2, wherein the step of slowing down said one or more motors comprises, active braking of the one or more motors.

4. The method according to claim 3, wherein said step of active braking of the one or more motors comprises generative braking of the one or more motors.

5. The method according to claim 1 wherein said aerial vehicle comprises one or more elevons, and wherein the step of maintaining the aerial vehicle as a substantially constant altitude using lift force provide by the fixed-wing, comprises, adjusting the angle of attack of the one or more elevons so that the lift force produced by the fixed-wing remains substantially constant.

6. The method according to claim 1, wherein said sensor is an imaging sensor.

7. The method according to claim 1, wherein said sensor is a 3D scanner.

8. The method according to claim 1, wherein at least one of said one or more motors is an internal combustion engine.

9. The method according to claim 1, wherein the method further comprises the steps of,
- operating at least one of the one or more motors to increase the speed of rotation of at least one of the one or more propellers, prior to the first time instant, so that the vehicle increases altitude; and
- wherein said step of slowing down of said one or more motors comprises slowing down of said one or more motors and allowing the vehicle to reach a zero vertical velocity; and
- wherein the step of taking a measurement using said sensor is performed when the vehicle has zero vertical velocity.

10. The method according to claim 9 wherein said step of slowing down of said one or more motors comprises slowing down of said one or more motors and allowing the vehicle to come to first reach a zero vertical velocity and subsequently decrease altitude.

11. The method according to claim 1, wherein said method further includes the step of adjusting the orientation of said aerial vehicle before taking a measurement using said sensor.

12. The method according to claim 1, wherein the method further comprises the steps of,
- operating at least one of the one or more motors to increase the speed of rotation of at least one of the one or more propellers, prior to the first time instant, so that the forward speed of the vehicle increases before the first time instant; and
- wherein said slowing down of said one or more motors causes the forward speed of the vehicle to decrease.

13. The method according to claim 1, wherein the step of slowing down said one or more motors so as to reduce the speed at which said one or more propellers rotate, comprises slowing down said one or more motors to a stop, wherein when the one or more motors are stopped the one or more motors do not spin the one or more propellers.

14. The method according to claim 1, wherein the controller determines a target speed of rotation for the one or more propellers required to maintain a substantially constant altitude, and at the third time instant the controller operates the one or more motors to rotate the one or more propellers at said determined target speed of rotation so that the aerial vehicle is maintained at a substantially constant altitude.

15. The method according to claim 1, wherein the predefined condition comprises when a predefined time instant has been reached.

16. The method according to claim 1, wherein the aerial vehicle comprises a measurement means which is mounted on the aerial vehicle, and wherein the predefined condition is a predefined value for the measurement means.

17. The method according to claim 1, wherein the measurement means comprises at least one of: a timer; an altimeter; an accelerometer; a gyroscope.

18. The method according to claim 1, wherein the predefined condition comprises when the vehicle has reached a predefined position.

19. A fixed-wing aerial vehicle comprising,
- one or more propellers;
- one or more motors which are configured to be selectively operable to drive the one or more propellers to rotate, wherein the one or more propellers generate a thrust force when rotated;
- a sensor mounted on the aerial vehicle, wherein the sensor is selectively operable to take a measurement of an object other than the aerial vehicle; and
- a controller which is configured to operate the one or more motors and said sensor so as to carry out the steps of:
- operating the one or more motors to rotate the one or more propellers at a speed that is sufficient to cause the vehicle to fly;
- at a first time instant, slowing down said one or more motors so as to reduce the speed at which said one or more propellers rotate, in response to detection that a predefined condition is fulfilled and/or in response to receiving a command at the controller;
- at a second time instant maintaining the aerial vehicle at a substantially constant altitude using lift force provide by the fixed-wing, for a time duration;
- during said time duration while the vehicle is maintained at said substantially constant altitude, taking a measurement of said object, using said sensor;
- detecting when the sensor has taken said measurement;
- at a third time instant, which is after the measurement has been taken by the sensor, operating the one or more motors again to rotate the one or more propellers at a speed that is sufficient to cause the vehicle to fly, in response to detecting that the sensor has taken said measurement.

20. The aerial vehicle according to claim 19, wherein said aerial vehicle comprises one or more elevons, and wherein the controller is further configured to adjust the angle of attack of the one or more elevons so that the lift force produced by the fixed-wing remains substantially constant in order to maintain the aerial vehicle at a substantially constant altitude.

* * * * *